United States Patent Office 2,710,099
Patented June 7, 1955

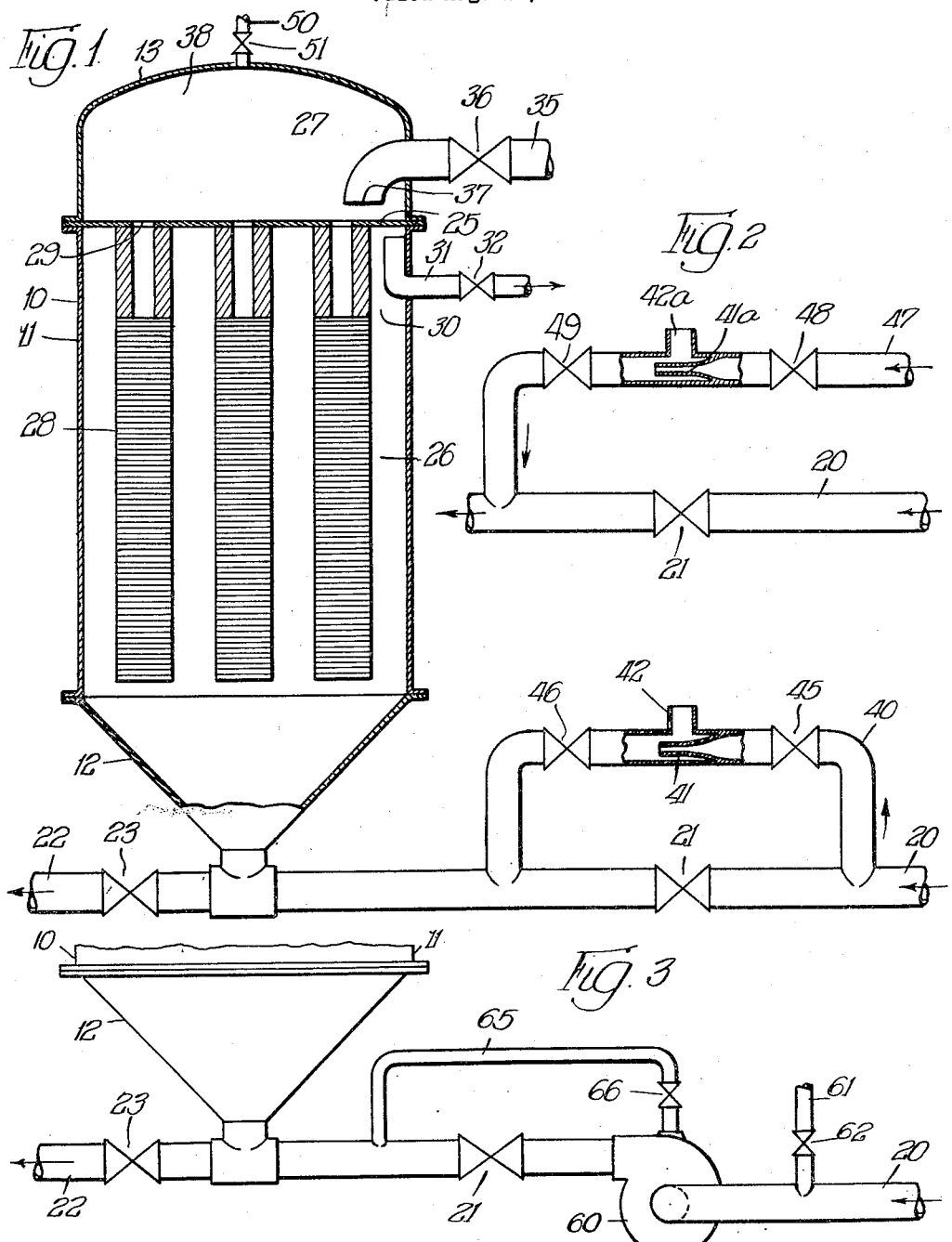

2,710,099

APPARATUS FOR CLEANING FILTERS

Anton A. Kalinske, Elmhurst, Ill., assignor to Infilco Incorporated, Chicago, Ill., a corporation of Delaware Application August 20, 1949, Serial No. 111,505

4 Claims. (Cl. 210—152)

This invention relates to filters of the type wherein the liquid is filtered through a filter element comprising a filter bed of diatomaceous earth or similar material which is deposited on a permeable support. More particularly the invention relates to means for and a method of cleaning the filter elements of such a filter. Filters of this general type are sometimes referred to in the art as diatomite filters and will be so designated herein for simplification. However, it is to be understood that I do not wish to limit myself thereby to any particular filter construction or filter material used therewith, but am using the term diatomite filter in a generic sense.

Diatomite filters are used for filtering until, due to the solids retained, the porosity of the filter bed or coat drops below a predetermined value. Thereafter filtering is interrupted and the elements are cleaned. Various methods of cleaning the filter elements have been suggested, such as backwashing by a reversal of flow, sometimes aided by streams of water along the outside of the elements.

More recently it has been suggested in Patent No. 2,423,172 to effect the removal of the dirty filter coat from the element and the cleaning of the support by what has been called in the art an "air-bump wash." My invention relates to an improvement in this method of cleaning filter elements and to apparatus suitable therefor.

It is an object of this invention to provide an improved apparatus and process for cleaning the filter elements of a ditoamite filter which is cheap and simple in construction and reliable in operation.

Another object of the invention is to provide a filter of the type described which can be washed by air but has a relatively light construction.

Another object is to provide an apparatus and a method for cleaning a diatomite filter by air bump wash which prevents, or minimizes, the effect of loss of air during the filtering operation.

Another object is to provide a diatomite filter which can be washed by a gas other than air.

These and other objects will become apparent upon consideration of the detailed description and the claims which follow.

In air bump washing according to said Patent No. 2,423,172 air is trapped in the filter by the liquid flowing from the filter inlet to the filter outlet and is compressed under inlet pressure. One body of air is compressed in the top portion of the filter and another body of air is compressed below the plate which supports the filter elements, the upper part of the elements being made impervious. A vent and a quick acting air valve are provided which permit instantaneous escape of the second or release body of air upon opening of the air valve. As soon as the release air escapes from the filter the operating air in the top of the filter expands and drives the water in the upper part of the filter and the elements with high velocity outwardly through the elements.

This cleaning operation has been found very effective. However, in actual practice certain difficulties have been encountered. Thus, the plate which supports the elements must be very strong and the seals between the elements and the plate must be perfectly air tight to permit trapping of air under the plate and prevent its escape. In spite of careful construction the air trapped under the supporting plate has sometimes been lost during the filtering operation and no air was available for the air-bump wash. It is, therefore, a specific object of my invention to improve the apparatus of Patent No. 2,423,172 and its operation to prevent lack of air for the washing operation and to permit a simpler and cheaper construction.

I have found that lack of air can be avoided when the air is not simply trapped at the beginning of the filter run and thereafter stored in the filter during the entire filtering operation without replenishing it. I suggest to pump or otherwise force air under pressure into the filter either during the entire run or preferably for a part of the run only. This air may be in addition to any air that has previously been trapped, or the apparatus may be operated without trapping of air, relying only on the air introduced into the apparatus under pressure.

The invention will be more clearly understood by reference to the drawings which form a part hereof and wherein similar elements are designated by the same reference characters.

Figure 1 is an elevation, partly in cross-section, of one embodiment of the invention;

Figure 2 shows a modification of the apparatus of Figure 1; and

Figure 3 is a partial elevation of another embodiment of the invention.

The filter of Figure 1 comprises a casing or housing 10 of any convenient shape, but preferably the casing has a circular boundary wall 11, a hopper bottom 12, and a cover 13. An inlet conduit 20 equipped with an inlet valve 21 discharges into the bottom portion of the casing 10. A waste outlet 22 equipped with a waste valve 23 leads from the bottom portion of the casing 10. A plate or partition 25 extends horizontally across the casing and may be fastened to the casing by any suitable means, as by clamping its peripheral edge between the upper edge of the wall 11 and the lower edge of the cover 13. The plate 25 divides the housing into a lower inlet chamber 26 and an upper outlet chamber 27.

Depending on the size of the plant, one or more filter elements 28 are provided in the inlet chamber 26. These elements may be of any suitable type but are shown for purposes of illustration as being formed by wire which is helically wound around a cage of foraminous material in the manner described in the patent to Paterson et al., No. 2,347,927. The elements are affixed to and supported by the plate 25 and for each element an opening 29 is provided in the plate 25 with which the element registers. Thus an open passageway is formed from the lower inlet chamber to the upper outlet chamber through the elements 28 and the openings 29.

The upper portion of the filter element is made of impervious material to provide an air release space 30 under the plate 25, where air will be trapped and compressed under inlet pressure by the liquid rising in the casing. An air outlet or vent 31, provided with a quick acting valve 32 leads from the space 30 between the impervious parts of the elements to outside the filter.

An outlet conduit 35 is provided with a valve 36. The intake 37 of the outlet conduit 35 is at an elevation which keeps the intake submerged in the liquid in the outlet chamber 27 and leaves sufficient space for air to be trapped and compressed under the cover 13. Thus a second air storage space 38 is provided in the casing. The apparatus thus far described is not new and is not claimed per se but only in conjunction with the new elements according to the invention which permit improved operation of the air bump wash.

If the apparatus described above is operated in the manner disclosed in said Booth patent, the plate 25 must be quite heavy, and an air tight seal must be provided between the plate and each element 28 to avoid leakage of air from the air release space 30 into the outlet chamber 27. In spite of such complicated and expensive construction it happens that one or more seals develop a leak and the air under the plate is lost. To overcome this defect I provide means operable to introduce air into the filter with the liquid to be filtered, whereby a sufficient quantity of release air is always available for washing of the filter elements.

One suitable means therefor is an aspirator which may be operated by the liquid flowing to the filter or by another source of liquid under pressure. As shown in Figure 1, the aspirator is operated by the liquid flowing to the filter. A by-pass or auxiliary conduit 40 is branched off from the inlet conduit 20 upstream of the inlet valve 21 and leads back to the inlet conduit downstream of the inlet valve 21. An aspirator 41 is provided in the by-pass 40 and when the valve 21 is throttled or closed liquid flowing through the by-pass aspirates air through the air inlet 42 of the aspirator into the liquid. The by-pass is also provided with valves 45 and 46 upstream and downstream of the aspirator, respectively.

Sometimes it is desirable to provide more than one aspirator and connect each such aspirator to the filter inlet conduit in similar manner as shown in Figure 1 for the aspirator 41.

In the embodiment of the invention shown in Figure 1, the air is introduced only during a part of the filter run and preferably at the end thereof. The by-pass valves 45 and 46 remain closed during a predetermined part of the filter run and thereafter the inlet valve 21 is partly or wholly closed, and the by-pass valves are partly or wholly opened, to aspirate a desired quantity of air and introduce it into the filter with the liquid to be filtered. By regulating the opening of the valves 45 and 46 and of the inlet valve 21, more or less air can be introduced into the filter. When the air laden liquid enters the filter, the air will rise vertically up through the liquid in the filter toward the plate 25. Any water that has been trapped in the air space 30 due to leakage of air, is displaced by the air through the elements into the outlet chamber 27 and thence through the outlet 35. Any excess of air over that which can be held and compressed in the air space 30 will escape with the water through the elements and the outlet. In this manner there is always a sufficient supply of air in the air release space when it is necessary to effect the air-bump wash operation at the end of a filter run.

The aspirator need not be operated by the water flowing to the filter but can be operated by any other suitable source of liquid under pressure. In Figure 2 the aspirator 41a is installed in an auxiliary conduit 47, which may be connected, to, and receive water under pressure from, for example, a city water pipe, such as the make-up water supply of a swimming pool. The pipe 47 discharges into the inlet conduit 20 downstream of valve 21. Valves 48 and 49 are provided on pipe 47 upstream and downstream of the aspirator 41a. When the valves 48 and 49 are partly or wholly open, the liquid under pressure flowing through pipe 47 aspirates air through air inlet 42a.

The aspirator of Figure 2 may be used as described in connection with Figure 1, during the last part of the filter run. However, in this embodiment, air can be introduced during the entire filter run, if desired, provided sufficient pressure is available in pipe 47 to discharge the air laden liquid from pipe 47 into the inlet conduit 20 without throttling or closing the inlet valve 21.

The apparatus of Figures 1 and 2 may also be used without trapping air. In this case the apparatus is provided with a vent 50 leading through the cover 13. The vent 50 is provided with a valve 51. In this method of operation the outlet valve 36 is closed during filling of the filter, and the air release valve 32 and vent valve 51 are held open until the liquid to be filtered has reached their respective levels. Liquid will thus displace all air in the filter. Thereafter, the valves 32 and 51 are closed and the outlet valve 36 is opened and the filter run is started. At a suitable time during filtering, preferably toward the end of the filter run, the by-pass valves 45 and 46 (Figure 1), or valves 48 and 49, respectively (Figure 2) and the inlet valve 21 are set so that a predetermined amount of air is aspirated into the liquid flowing to the filter. Upon entering the filter the air will rise through the liquid to the plate and fill air space 30, displacing the liquid under the plate through the elements. When the air space 30 is filled with air compressed under inlet pressure, further air entering the filter will be carried with the liquid into the outlet chamber and rise to its top, displacing liquid from the space 27. By establishing the two bodies of air in air spaces 30 and 27 just before the end of the run, leakage through the seals between the supporting plate 25 and the elements 28 will not cause lack of air for washing. Obviously, with the apparatus of Figure 2, the two bodies of air can be established at any time during the filter run and thereafter small quantities of air added continuously to make up for any loss of air.

The operation of the filter without trapping of air permits also to carry out the washing step with a gas other than air. Sometimes it is undesirable to operate the air-bump wash with air, for example, where the presence of air in the filtered liquid causes corrosion in subsequent apparatus. In such case, another suitable gas may be used as washing fluid and may be forced into the filter in similar manner by connecting the air inlet of the aspirator 41 to a suitable source of gas instead of connecting it to atmosphere.

The embodiment of the invention shown in Figure 3 utilizes another means for introducing air into the filter with the liquid to be filtered. This means is only suitable where the liquid to be filtered is pumped to the filter. In this embodiment of the invention a centrifugal pump 60 is provided on the inlet conduit 20 which pumps the liquid to be filtered into the filter. A small air inlet pipe 61, provided with a valve 62, is connected with one end to the inlet conduit 20 upstream of the pump 60 and with the other to atmosphere, whereby air is sucked into the water flowing to the pump. An air bleed line 65, provided with a valve 66, leads from the upper part of the pump 60 and discharges to the inlet conduit 20 downstream of the inlet valve 21. The air introduced into the pump 60 will rise to its top, and by proper positioning of the valve 66, a predetermined amount of air can be passed through the air bleed line 65 into the inlet conduit 20 downstream of the inlet valve 21 and will be carried into the filter by the water discharged by the pump. In this modified apparatus the air may be introduced during the entire filter run or it may be only introduced during the last part of the filter run. In either case there will always be a sufficient body of release air available for operating the air-bump wash.

The embodiment of Figure 3 can also be operated without trapping air in the manner described in connection with Figures 1 and 2.

By connecting the air inlet line 61 to a suitable source of gas rather than to atmosphere, any gas can be used as washing fluid also in this embodiment of the invention.

Obviously, the air under pressure for replenishing the trapped air bodies in the filter, or for providing the air bodies when the filter is operated without trapping of air, as described, may also be provided by a compressor, which can be directly connected to the two air spaces 30 and 27, or to the inlet line 20. However, the use of such a compressor involves unnecessary additional cost and is, therefore, less desirable. It is generally entirely satisfactory to use atmospheric air and introduce it into and compress it in the filter under the inlet pressure of the liquid to be filtered.

It will be seen that the invention permits a cheaper construction of the filter and results in more reliable performance. The invention also makes it possible to apply the advantages of the air-bump wash to the filtering of such liquids which should not be in contact with air during filtering.

I claim:

1. In a diatomite filter including a casing having a top, an inlet for the liquid to be filtered, an outlet for the filtered liquid, an inlet conduit discharging into said casing through said inlet, a filter element interposed between said inlet and said outlet, wall means forming an air space in open communication with the liquid upstream of said element, said top forming a second air space in open communication with liquid downstream of said element, a vent from said first air space, and a quick acting valve on said vent: the combination with said inlet conduit of aspirating means for introducing a gas into said inlet conduit and discharging it under liquid inlet pressure into said casing during filtering.

2. The apparatus of claim 1 wherein said aspirating means for introducing a gas into said inlet conduit comprises an auxiliary conduit discharging into said inlet conduit, an aspirator connected with said auxiliary conduit, a valve on said inlet conduit upstream of the point of discharge of said auxiliary conduit, and valves on said auxiliary conduit upstream and downstream of said aspirator, the inlet end of said auxiliary conduit being adapted to be connected to a source of liquid under pressure.

3. The apparatus of claim 1 wherein said aspirating means for introducing a gas under pressure comprises a centrifugal pump on said inlet conduit, a gas inlet into said inlet conduit upstream of said pump, a by-pass leading from said pump and discharging into said inlet conduit downstream of said pump, valves connected with said by-pass and said gas inlet, and a valve on said inlet conduit intermediate said pump and the point of discharge of said by-pass.

4. In a diatomite filter including a casing having a top, an inlet into a lower portion of said casing, an outlet leading from an upper portion of said casing, an inlet conduit discharging into said casing through said inlet, a valve on said conduit, a filter element interposed between said inlet and said outlet, wall means forming an air space in open communication with liquid upstream of said element, said top forming a second air space in open communication with liquid downstream of said element, and means for quickly venting said first mentioned air space: the combination with said inlet conduit of a by-pass leading from said inlet conduit upstream of said valve and discharging to said inlet conduit downstream of said valve, an aspirator connected with said by-pass, and flow regulating means connected with said by-pass.

References Cited in the file of this patent

UNITED STATES PATENTS

| Number | Name | Date |
|---|---|---|
| 1,452,151 | Genter et al. | Apr. 17, 1923 |
| 1,628,510 | Perry | May 10, 1927 |
| 1,724,436 | Sweetland | Aug. 13, 1929 |
| 1,922,920 | Aherne | Aug. 15, 1933 |
| 2,041,048 | Chesny | May 19, 1936 |
| 2,237,882 | Lawlor et al. | Apr. 8, 1941 |
| 2,239,612 | Lawlor | Apr. 22, 1941 |
| 2,254,597 | Berger et al. | Sept. 2, 1941 |
| 2,370,772 | Bowers | Mar. 6, 1945 |
| 2,423,172 | Booth | July 1, 1947 |
| 2,468,603 | Pew | Apr. 26, 1949 |
| 2,570,132 | Koupal | Oct. 2, 1951 |